US012049086B2

(12) United States Patent
Ojima et al.

(10) Patent No.: US 12,049,086 B2
(45) Date of Patent: Jul. 30, 2024

(54) INKJET PRINTER

(71) Applicant: CANON KABUSHIKI KAISHA, Tokyo (JP)

(72) Inventors: Masatomo Ojima, Kawaguchi (JP); Hirofumi Okuhara, Tokyo (JP); Tatsuo Nanjo, Kawasaki (JP); Chiaki Muraoka, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/306,094

(22) Filed: Apr. 24, 2023

(65) Prior Publication Data

US 2023/0256744 A1 Aug. 17, 2023

Related U.S. Application Data

(63) Continuation of application No. 17/890,983, filed on Aug. 18, 2022, now Pat. No. 11,794,481, which is a continuation of application No. 16/752,401, filed on Jan. 24, 2020, now Pat. No. 11,458,734.

(30) Foreign Application Priority Data

Feb. 4, 2019 (JP) ................................ 2019-018303

(51) Int. Cl.
*B41J 2/175* (2006.01)

(52) U.S. Cl.
CPC ....... *B41J 2/17506* (2013.01); *B41J 2/17523* (2013.01); *B41J 2/17553* (2013.01); *B41J 2/17513* (2013.01)

(58) Field of Classification Search
CPC .. B41J 2/17523; B41J 2/17513; B41J 2/1752; B41J 2/17553; B41J 2/17503; B41J 2/17509; B41J 2/16508
See application file for complete search history.

(56) References Cited

U.S. PATENT DOCUMENTS

| | | | | |
|---|---|---|---|---|
| 7,537,322 | B2 * | 5/2009 | Ishikawa | B41J 2/17509 347/85 |
| 2015/0352853 | A1 * | 12/2015 | Kudo | B41J 29/02 347/86 |
| 2018/0281440 | A1 * | 10/2018 | Horade | B41J 2/1752 |

OTHER PUBLICATIONS

"Brother" Amazon.com—Brother MFC-J5430DW Printer Information including Replacement Tubes and Date for Sale Oct. 29, 2022; Retrieved Mar. 20, 2024. (Year: 2022).*

* cited by examiner

*Primary Examiner* — John Zimmermann
(74) *Attorney, Agent, or Firm* — Canon U.S.A., Inc., IP Division

(57) ABSTRACT

An inkjet printer includes an inkjet head configured to discharge ink and an ink tank including a plurality of ink storage portions in which the ink is stored to supply the ink to the inkjet head via a connected tube, and replenishing ports via which the plurality of ink storage portions is replenished with ink, wherein the ink tank has an outer wall facing an outer side of the ink tank and having a thickness greater than a thickness of a partition wall arranged between the plurality of ink storage portions.

17 Claims, 4 Drawing Sheets

E-E

B-B

C-C

D-D

INKJET PRINTER

CROSS-REFERENCE TO RELATED APPLICATIONS

The present application is a continuation of U.S. patent application Ser. No. 17/890,983, filed on Aug. 18, 2022, which is a continuation of U.S. patent application Ser. No. 16/752,401, filed on Jan. 24, 2020, and issued as U.S. Pat. No. 11,458,734 on Oct. 4, 2022 which claims priority from Japanese Patent Application No. 2019-018303, filed Feb. 4, 2019, each which is hereby incorporated by reference herein in their entirety.

BACKGROUND OF THE INVENTION

Field of the Invention

The present disclosure relates to an inkjet printer.

Description of the Related Art

Conventionally, among inkjet printers that discharge liquid to perform recording on a recording medium such as a sheet, an inkjet printer including an ink-stored ink tank that is replaced with a new ink tank when the ink is used up is widely used. In recent years, however, an inkjet printer including an ink tank in which ink is replenished by a user when ink inside the ink tank is used up has been widespread. The user replenishes the ink tank with ink from a replenishing port provided on the ink tank. Accordingly, the inkjet printer performs recording again without replacement of the ink tank even when the ink inside the ink tank is used up. Such an ink tank can store a large volume of ink, and is connected to an inkjet head that discharges liquid via a tube.

The ink tank in which ink can be replenished by the user has a large capacity, and thus exhaustion of the ink inside the ink tank takes time. Since moisture in the ink is transmitted through an outer wall of the ink tank and gradually released to the air, a lengthy period of time for exhaustion of the ink causes a large amount of moisture to evaporate from the ink. Particularly, in a state where a remaining ink amount is small in the latter half of the lengthy period of time, it is conceivable that most of moisture has evaporated from ink. Consequently, the ink inside the ink tank has higher viscosity. An increase in ink viscosity may affect recording quality. Japanese Patent Application Laid-Open No. 2005-74755 discusses a method for reducing evaporation of moisture inside ink to reduce such an increase in ink viscosity. According to the method, a humidifier is arranged in an inkjet printer to adjust humidity, so that evaporation of moisture inside ink is reduced.

SUMMARY OF THE INVENTION

According to an aspect of the present disclosure, an inkjet printer includes an inkjet head configured to discharge ink and an ink tank including a plurality of ink storage portions in which the ink is stored to supply the ink to the inkjet head via a connected tube, and replenishing ports through which the plurality of ink storage portions is replenished with ink, wherein the ink tank has an outer wall facing an outer side of the ink tank and having a thickness greater than a thickness of a partition wall arranged between the plurality of ink storage portions.

Further features of the present disclosure will become apparent from the following description of exemplary embodiments with reference to the attached drawings.

DESCRIPTION OF THE EMBODIMENTS

In Japanese Patent Application Laid-Open No. 2005-74755, an inkjet printer includes a humidifier. This causes an increase in size of the inkjet printer. The present disclosure has been made in view of such circumstances and is provided for an inkjet printer including a large-capacity ink tank in which ink can be replenished by a user to reduce evaporation of moisture inside the ink tank without an increase in size of the inkjet printer.

Hereinafter, exemplary embodiments of the present disclosure will be described in detail. Each of the exemplary embodiments is described using an ink tank in which four types (four colors) of ink can be stored. However, the present disclosure is not limited thereto. That is, the present disclosure can be applied to an ink tank capable of storing three colors of ink, and an ink tank for multiple ink colors of four or more colors such as six colors and eight colors.

(Inkjet Printer)

Figure 1:
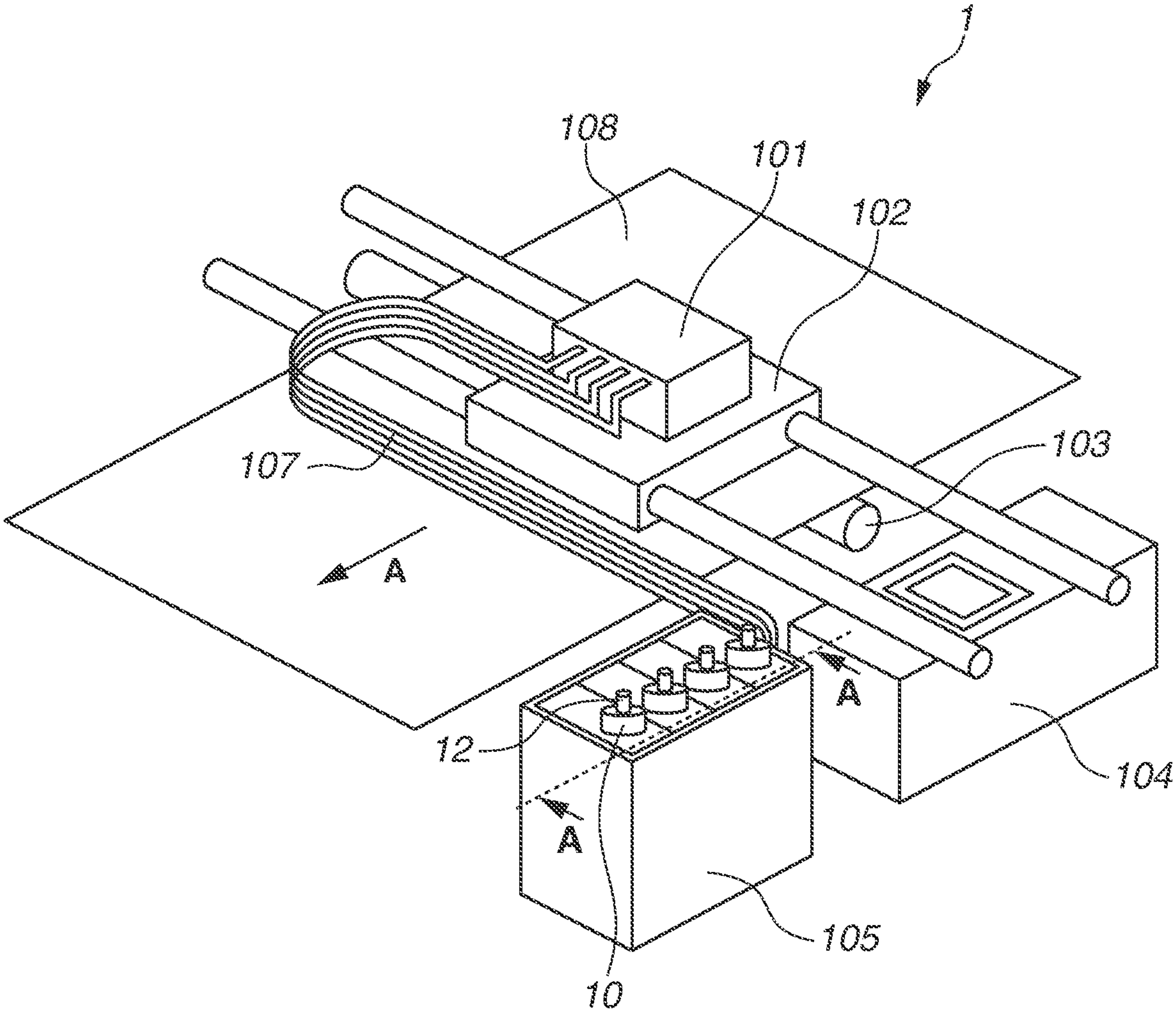
FIG. 1 is a schematic diagram illustrating an inkjet printer.

An inkjet printer 1 of a first exemplary embodiment will be described with reference to a schematic diagram illustrated in FIG. 1. While the inkjet printer 1 repeatedly moves an inkjet head 101 in a reciprocating manner (main scanning) and conveys a recording sheet 108, which is a recording medium, at a predetermined pitch (sub-scanning), the inkjet printer 1 discharges ink from the inkjet head 101 in synchronization with the repeated main scanning and sub-scanning operations to perform recording. As for the recording sheet 108, an optional recording medium can be used as long as ink droplets can land thereon to be recorded. For example, paper, cloth, a label surface of an optical disk, a plastic sheet, an overhead projector (OHP) sheet, and an envelope that are made of various materials and formed in various styles can be used as recording media.

The inkjet head 101 is detachably mounted on a carriage 102 arranged such that the carriage 102 can slide on two guide rails. The carriage 102 is driven by a drive unit (not illustrated) such as a motor to reciprocate along the guide rails. The recording sheet 108 on which ink discharged from the inkjet head 101 lands is conveyed by a conveyance roller 103, serving as a conveyance unit, in a direction (indicated by an arrow A) intersecting with a movement direction of the carriage 102. Since the inkjet head 101 discharges a plurality of colors (cyan, magenta, yellow, and black) of ink, the inkjet head 101 has a plurality of nozzle rows each having a plurality of discharge ports for discharging ink.

The inkjet printer 1 includes an ink tank 105 in which ink to be discharged from the inkjet head 101 can be stored. The ink tank 105 can store a plurality of types of ink depending on types of ink to be discharged. In FIG. 1, the ink tank 105 for four types of ink is illustrated. The ink tank 105 of the present exemplary embodiment is designed to have larger capacity than a replacement-type ink tank that has been conventionally common. When ink stored in the ink tank 105 is used up, a user first removes a cap 12 attached to a replenishing port 10 of the ink tank 105. Then, the user fills (replenishes) the ink tank 105 with ink via the replenishing port 10 from an ink bottle with which replenishment ink is filled. The user reattaches the cap 12 to the replenishing port 10 after completing the ink replenishment, and a series of the ink replenishment processes ends. The ink tank 105 and the inkjet head 101 are connected by a plurality of ink supply tubes 107 for respective colors of ink.

In a non-recording area that is within a range of reciprocating movement of the inkjet head 101 and outside a pass range of the recording sheet 108, a recovery unit 104 is arranged opposite an ink discharge surface of the inkjet head 101. The recovery unit 104 includes a cap portion and a suction mechanism. The cap portion is used to cap the ink discharge surface of the inkjet head 101, and the suction mechanism forcibly suctions ink from the inkjet head 101 with the ink discharge surface capped. Moreover, the recovery unit 104 includes a cleaning blade that removes soiling from the ink discharge surface.

(Ink Tank)

Figure 2A:
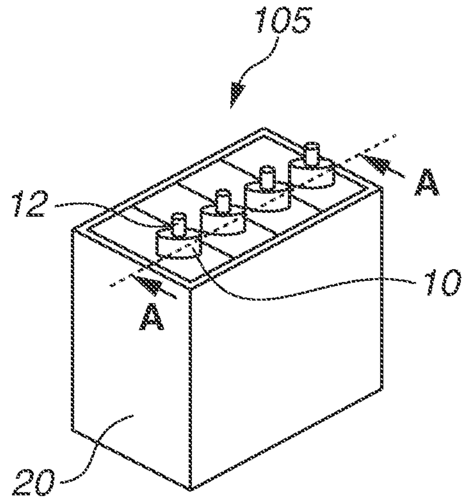
FIGS. 2A and 2B are schematic diagrams each illustrating an ink tank according to a first exemplary embodiment.
Figure 2B:
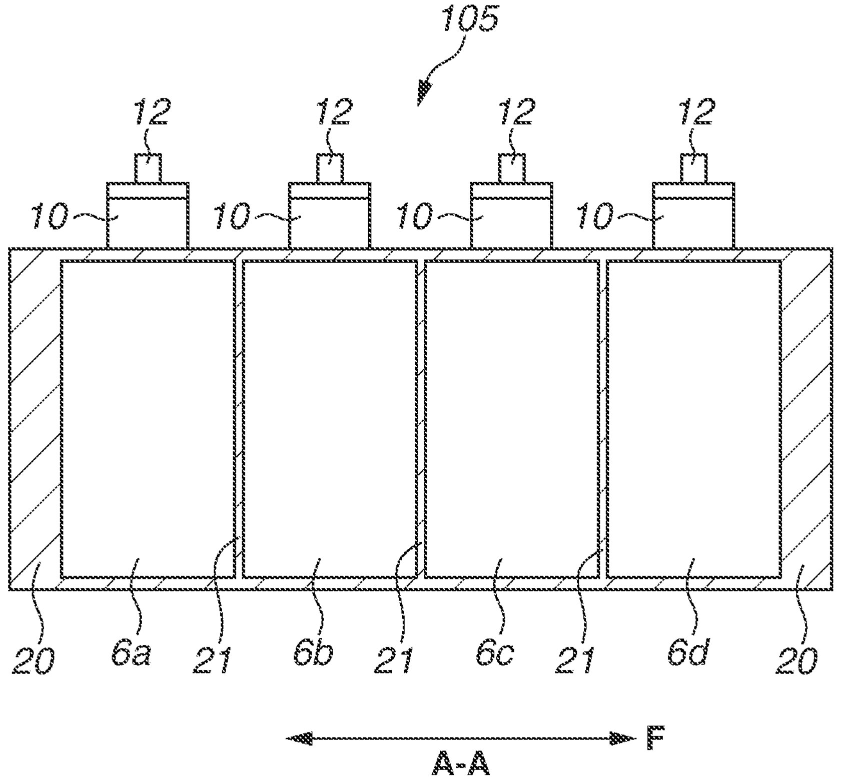

The ink tank 105 will be described with reference to FIGS. 2A and 2B. FIG. 2A is a schematic diagram illustrating the ink tank 105, and FIG. 2B is a sectional view along the line A-A of FIG. 2A. As illustrated in FIG. 2B, the ink tank 105 includes a plurality of ink storage portions (6*a*, 6*b*, 6*c*, and 6*d*), and ink is stored in each of the ink storage portions. In the plurality of ink storage portions (6*a*, 6*b*, 6*c*, and 6*d*), a first ink storage portion 6*a*, a second ink storage portion 6*b*, a third ink storage portion 6*c*, and a fourth ink storage portion 6*d* are arranged side by side in a line in this order. In addition, a partition wall 21 is arranged between the ink storage portions such that the ink stored in the respective ink storage portions is not mixed.

Herein, for example, moisture in the ink stored in the first ink storage portion 6*a* is transmitted through an outer wall 20 of the ink tank 105 and released to outside air and also transmitted through the partition wall 21 and released to the second ink storage portion 6*b*. Thus, it is conceivable that an increase in thickness of each of the outer wall 20 and the partition wall 21 reduces ink evaporation speed. That is, if evaporation of moisture in ink is merely intended to be reduced, thicknesses of all of the outer wall 20 and the partition walls 21 forming the ink tank 105 can be increased.

However, an increase in thicknesses of all of the outer wall 20 and the partition walls 21 causes an increase in size of the ink tank 105. This causes an increase in size of the inkjet printer 1 in which the ink tank 105 is mounted. Meanwhile, some moisture in the ink in the second ink storage portion 6*b* is transmitted through the partition wall 21 and released to the first ink storage portion 6*a*. Thus, although moisture in the ink in the first ink storage portion 6*a* is transmitted through the partition wall 21 and released to the second ink storage portion 6*b*, moisture is also released to the first ink storage portion 6*a* from the second ink storage portion 6*b*. Accordingly, the moisture lost from the first ink storage portion 6*a* is replenished via the partition wall 21. Moreover, since the second ink storage portion 6*b* is arranged behind the partition wall 21 as viewed from the first ink storage portion 6*a*, an amount of moisture (an amount of ink) to be released from the first ink storage portion 6*a* toward the second ink storage portion 6*b* having an abundant amount of moisture (an abundant amount of ink) is small in the first place. Accordingly, based on study by the inventors of the present disclosure, moisture in the first ink storage portion 6*a* that evaporates via the partition wall 21 is substantially little. Hence, even in a case where the partition wall 21 is set to be thinner than the outer wall 20, evaporation of the ink is rarely facilitated by such a thinner partition 21.

Accordingly, in the present disclosure, a thickness of the outer wall 20 substantially contributing to evaporation of ink is increased, and a thickness of the partition wall 21 contributing little to evaporation of ink is reduced, thereby reducing an increase in size of an inkjet printer while reducing evaporation of moisture in ink. In particular, a thickness of the outer wall 20 of the ink tank 105 is set to be greater than a thickness of the partition wall 21.

The term "outer wall" used herein refers to a wall that faces an outer side of the ink tank (faces an area outside the ink tank), contacts the outside air, and forms the ink tank. Moreover, the term "partition" used herein refers to a wall that is provided in an inner side of the ink tank to partition each of the ink storage portions. The outer wall 20 and the partition wall 21 are integrally formed.

The outer wall 20 preferably has a thickness of 2.0 mm or more, and more preferably has a thickness of 5.0 mm or more from the standpoint of ink evaporation reduction. However, if the outer wall 20 is excessively thick, size of the ink jet printer can be increased. Accordingly, the outer wall 20 preferably has a thickness of 10.0 mm or less. The partition wall 21 preferably has a thickness of 1.5 mm or less, and more preferably has a thickness of 1.0 mm or less from the standpoint of reduction of an increase in ink tank size. However, if the partition wall 21 is excessively thin, an outer shape of the ink tank 105 is not easily maintained. Accordingly, the partition wall 21 preferably has a thickness of 0.5 mm or more. If a thickness of the outer wall 20 is set to "1", a thickness of the partition wall 21 is preferably 0.4 or less, and is more preferably 0.3 or less from the standpoint of ink evaporation reduction while reducing an increase in ink tank size. Similarly, if a thickness of the outer wall 20 is set to "1", a thickness of the partition wall 21 is preferably 0.2 or more from the standpoint of maintenance of outer shape of the ink tank 105. Herein, the thickness of the outer wall 20 is an average value of thicknesses of 10 portions randomly selected from an area of the outer wall 20. Similarly, the thickness of the partition wall 21 is an average value of thicknesses of 10 portions randomly selected from an area of the partition wall 21.

Figure 3A:
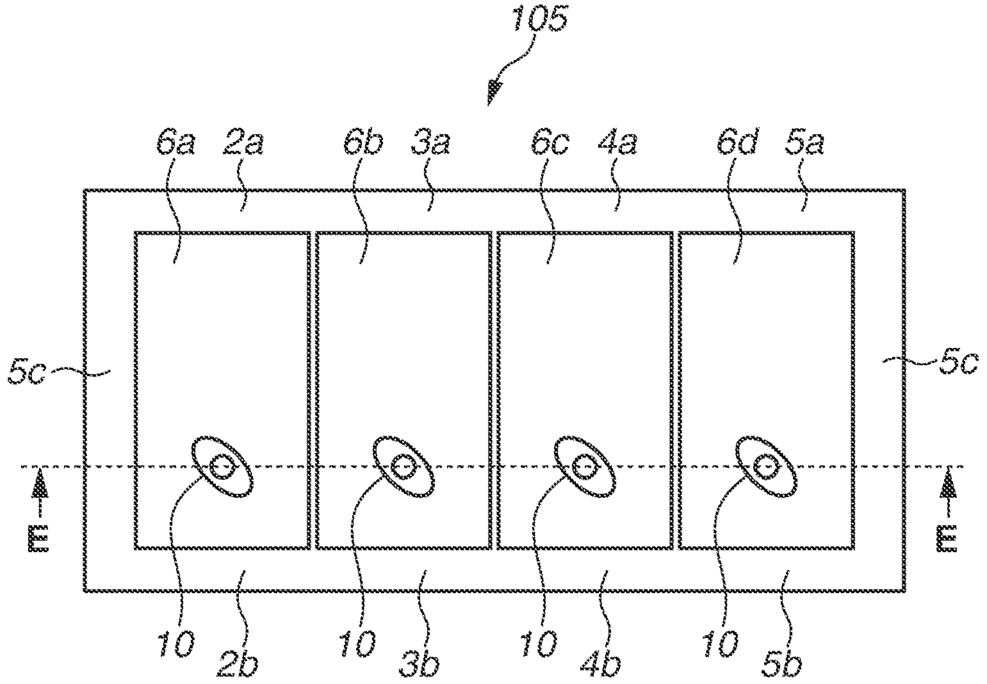
FIGS. 3A and 3B are diagrams each illustrating arrangement of ink according to a second exemplary embodiment.
Figure 3B:
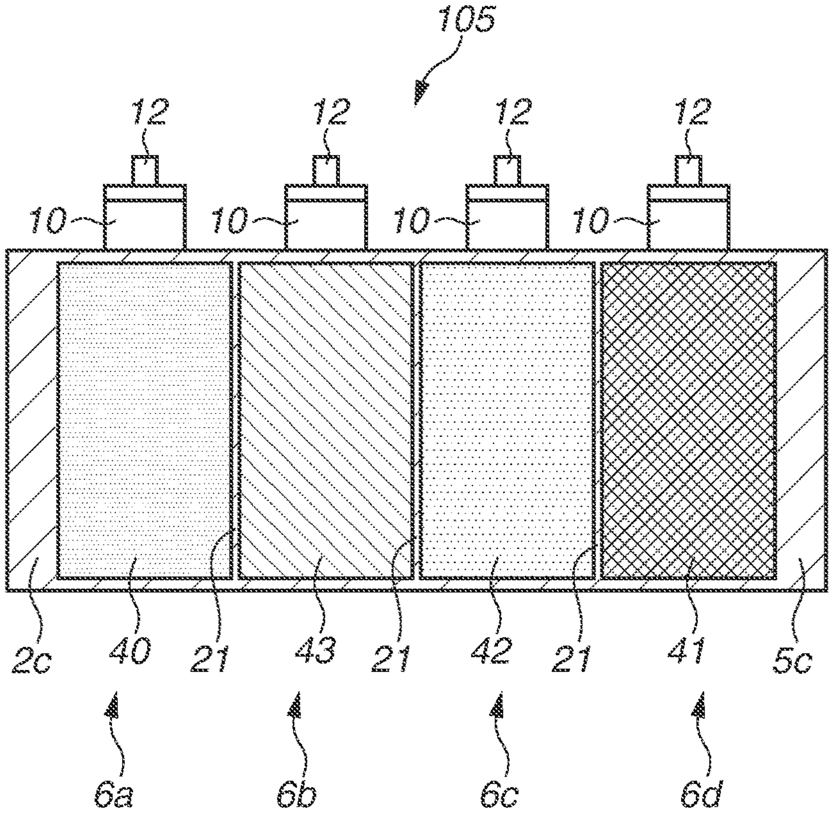

A second exemplary embodiment will be described with reference to FIGS. 3A and 3B. Components and configurations that are similar to the first exemplary embodiment are given the same reference numerals as above and description thereof will be omitted. FIG. 3A is a schematic diagram illustrating a top surface of the ink tank 105, and FIG. 3B is a schematic sectional view along the line E-E of FIG. 3A. In the present exemplary embodiment, ink having a high moisture evaporation speed is stored in a second ink storage portion 6*b* or a third ink storage portion 6*c* arranged between other ink storage portions on both sides. Moreover, ink having a low moisture evaporation speed is stored in a first ink storage portion 6*a* or a fourth ink storage portion 6*d* arranged on an outer side.

Mainly, moisture in ink is transmitted through an outer wall 20 that contacts the outside air and released to the outside air, so that ink evaporates. Thus, the larger the area of the outer wall 20, the higher the evaporation speed, regardless of an ink type. The term "evaporation speed" used herein represents an evaporation amount of ink that evaporates per unit time. As illustrated in FIG. 3A, the first ink storage portion 6*a* has three outer walls (2*a*, 2*b*, 2*c*) that contact the outside air, and the fourth ink storage portion 6*d* has three outer walls (5*a*, 5*b*, 5*c*) that contact the outside air. Thus, ink stored in the first ink storage portion 6*a* and the fourth ink storage portion 6*d* evaporates faster. On the other hand, the second ink storage portion 6*b* has only two outer walls (3*a*, 3*b*) that contact the outside air, and the third ink storage portion 6*c* has only two outer walls (4*a*, 4*b*) that contact the outside air. Thus, an evaporation speed of ink stored in the second ink storage portion 6*b* and the third ink storage portion 6*c* is lower than that of ink stored in each of the first ink storage portion 6*a* and the fourth ink storage portion 6*d*.

In the present specification, a method for measuring an ink evaporation speed is as follows. First, 100 g of ink is weighed, and the 100 g ink is poured into a Japanese Industrial Standards (JIS) R3503-compliant 100 ml beaker made of Pyrex (registered trademark) glass in an environment where a temperature is 25° C. and a relative humidity is 50%. Then, the beaker containing the ink is left to stand for 10 hours in an environment where a temperature is 60° C. and a humidity is 20% to allow the ink to evaporate. Subsequently, the beaker with remaining ink from the evaporation is again placed in the environment where a temperature is 25° C. and a relative humidity is 50%. When a temperature of the ink attains equilibrium at 25° C., a weight in this environment is measured. An ink evaporation amount per unit time is calculated from a value of this weight and a value of the weight prior to the evaporation process.

In the ink tank, in addition to the outer walls (2*a*, 2*b*, 2*c*/3*a*, 3*b*/4*a*, 4*b*/5*a*, 5*b*, 5*c*) forming side surfaces of the ink tank, but also the top surface and the bottom surface of the ink tank serve as outer walls that contact the outside air. In each of the ink storage portions, however, there is not much difference in terms of an amount of moisture that is transmitted through the top surface and the bottom surface of the ink tank and evaporates. In the present exemplary embodiment, the top surface and the bottom surface of the ink tank are not considered, whereas the outer walls positioned at locations other than the top surface and the bottom surface of the ink tank are considered. Accordingly, among the outer walls of the ink tank, attention will be paid to side walls (2*a*, 2*b*, 2*c*/3*a*, 3*b*/4*a*, 4*b*/5*a*, 5*b*, 5*c*) which make difference to ink evaporation amounts in the respective ink storage portions, and ink is arranged as described above.

If evaporation speeds of ink W 40, ink X 41, ink Y 42, and ink Z 43 have a relation of ink W 40<ink X 41<ink Y 42<ink Z 43, ink is stored as follows. One of the ink Y 42 and the ink Z 43 having a high evaporation speed is stored in the second ink storage portion 6*b*, and the other is stored in the third ink storage portion 6*c*. Moreover, one of the ink W 40 and the ink X 41 having a low evaporation speed is stored in the first ink storage portion 6*a*, and the other is stored in the fourth ink storage portion 6*d*. Accordingly, evaporation of ink that is liable to evaporation can be reduced more.

Moreover, evaporation amounts of moisture in respective ink may be substantially equal. In such a case, if recording is performed, a change in tint of ink may be larger than that at normal time depending on lightness of ink. More particularly, tint of the ink barely changes even when moisture in ink having a low lightness evaporates. However, if moisture in ink having a high lightness evaporates, a change in tint of the ink is greater than that of the ink having a low lightness. Thus, evaporation of ink having a high lightness is preferably reduced relative to evaporation of ink having low lightness.

Hence, if lightnesses of the ink W 40, the ink X 41, the ink Y 42, and the ink Z 43 have a relation of ink W 40<ink X 41<ink Y 42<ink Z 43, ink is preferably stored as follows. One of the ink Y 42 and the ink Z 43 having a high lightness is stored in the second ink storage portion 6*b*, and the other is stored in the third ink storage portion 6*c*. Moreover, one of the ink W 40 and the ink X 41 having a low lightness is stored in the first ink storage portion 6*a*, and the other is stored in the fourth ink storage portion 6*d*. Accordingly, a significant change in tint of the ink having a high lightness can be reduced.

Figure 4A:
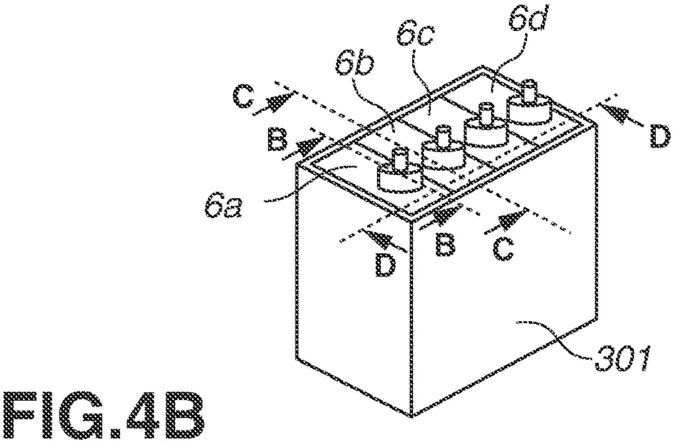
FIGS. 4A through 4D are diagrams each illustrating an ink tank according to a third exemplary embodiment.
Figure 4B:
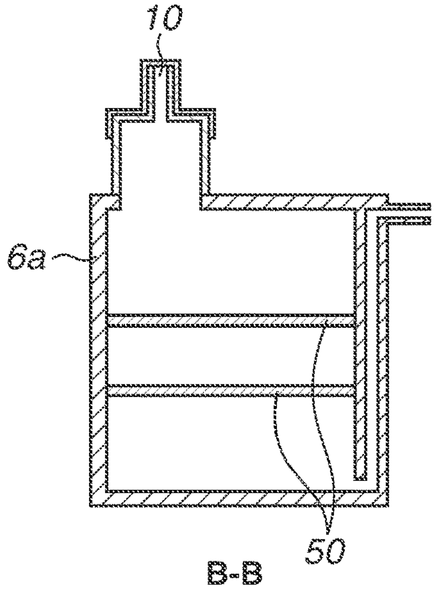
Figure 4C:
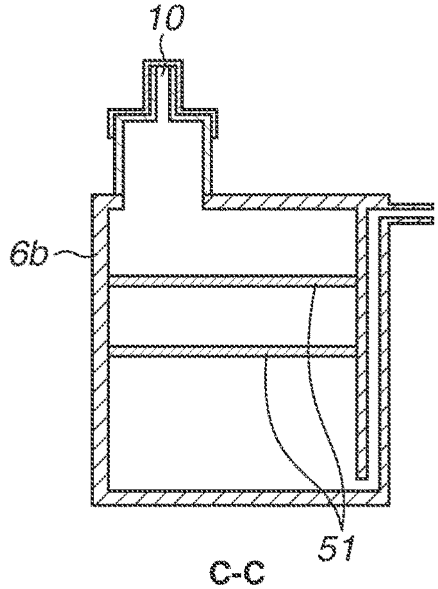
Figure 4D:
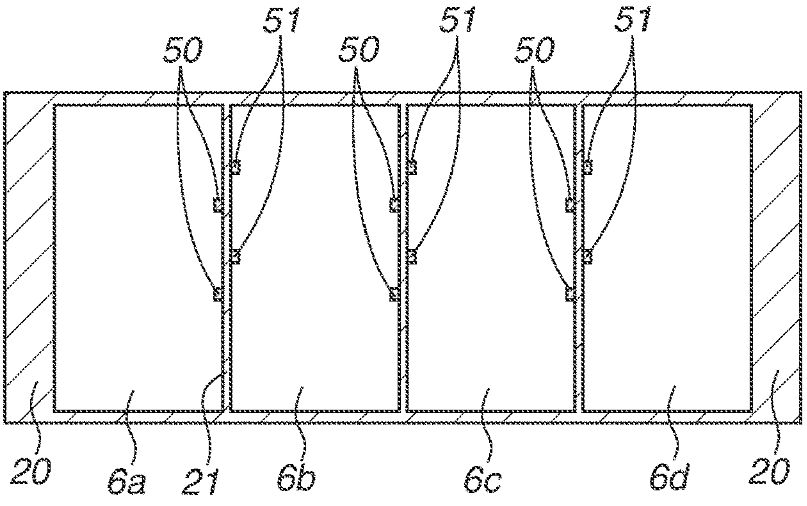

A third exemplary embodiment will be described with reference to FIGS. 4A through 4D. Components and configurations that are similar to the first exemplary embodiment are given the same reference numerals as above and description thereof will be omitted. FIG. 4A is a schematic diagram illustrating an ink tank 301 according to the present exemplary embodiment. FIGS. 4B, 4C, and 4D are schematic sectional views along respective lines B-B, C-C, and D-D of FIG. 4A.

In the present exemplary embodiment, the ink tank 301 includes a partition wall 21 having ribs (50, 51). A strength of the partition wall 21 is reduced with reduction in thickness of the partition wall 21. Thus, as illustrated in FIGS. 4A through 4D, the arrangement of the rib 50 in a first ink storage portion 6*a* enables a strength of the partition wall 21 with the reduced strength to be enhanced. Moreover, the arrangement of the rib can further reduce a thickness of the partition wall 21 and a size of the ink tank.

Similarly, ribs (50, 51) are arranged on each of the second ink storage portion 6*b*, the third ink storage portion 6*c*, and the fourth ink storage portion 6*d*, so that the strength can be further enhanced. Herein, as illustrated in FIG. 4D, the ribs (50, 51) are preferably arranged in the ink tank 301 such that the ribs 50 and 51 do not overlap when the partition wall 21 is seen from a direction perpendicular to the partition wall 21 from a strength assurance standpoint.

In the present exemplary embodiment, a thickness of the partition wall 21 is an average value of thicknesses of 10 portions randomly selected from an area of the partition wall 21 excluding the ribs (50, 51).

According to the present disclosure, evaporation of moisture in ink inside an ink tank can be reduced, and an increase in ink viscosity can be reduced without an increase in size of an ink jet printer.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An inkjet printer comprising:

an inkjet head configured to discharge ink;

a plurality of ink storage portions, in each of which ink to be supplied to the inkjet head is stored, and each of which has a replenishing port for replenishing ink; and a plurality of tubes configured to connect the plurality of ink storage portions with the inkjet head, wherein, in the inkjet printer, the plurality of tubes includes a curved portion which is curved in a horizontal direction where the plurality of tubes is adjacently aligned in a vertical direction, a first portion which is connected to the inkjet head where the plurality of tubes is aligned in the horizontal direction, and a second portion where the plurality of tubes is adjacently aligned in the vertical direction between the curved portion and the first portion.

2. The inkjet printer according to claim 1, wherein the inkjet head is configured to move in a reciprocating manner in a direction intersecting with a conveying direction of a recording medium.

3. The inkjet printer according to claim 2,
wherein the inkjet head is configured to be mounted on a carriage configured to move in the reciprocating manner in the direction intersecting with the conveying direction of the recording medium, and
wherein, on the carriage, the plurality of tubes is arranged to be adjacently aligned in the vertical direction and to be connected to the inkjet head in a state of being aligned in the horizontal direction.

4. The inkjet printer according to claim 1, wherein the plurality of tubes is adjacently aligned in the horizontal direction and connected to the inkjet head.

5. The inkjet printer according to claim 1,
wherein the inkjet head has a connection portion configured to connect the plurality of tubes to the inkjet head, and
wherein, among the plurality of tubes adjacently aligned in the vertical direction, a tube positioned at an uppermost side is connected to the inkjet head at a position closest to the inkjet head toward a direction in which the plurality of tubes approaches the connection portion.

6. The inkjet printer according to claim 1, wherein, between the first portion and the second portion, the plurality of tubes includes a third portion extending in the vertical direction.

7. The inkjet printer according to claim 1,
wherein the plurality of ink storage portions include four ink storage portions for four types of ink,
wherein the four ink storage portions include a first ink storage portion, a second ink storage portion, a third ink storage portion, and a fourth ink storage portion, and the four ink storage portions are arranged side by side in a line.

8. The inkjet printer according to claim 1, wherein the replenishing port has a detachable cap.

9. The inkjet printer according to claim 1, wherein the replenishing port is provided so that an upper side of the replenishing port is configured to be open in the vertical direction.

10. The inkjet printer according to claim 1, wherein each of the plurality of ink storage portions includes a rib.

11. The inkjet printer according to claim 1,
wherein the inkjet head has a connection portion configured to connect the plurality of tubes to the inkjet head, and
wherein the connection portion is disposed, in a conveying direction of a recording medium, at a side where the plurality of ink storage portions is disposed.

12. The inkjet printer according to claim 1,
wherein the plurality of ink storage portions is positioned at a front side of the inkjet printer, and
wherein the plurality of tubes is connected to a side of the inkjet head at the front side of the inkjet printer.

13. The inkjet printer according to claim 2, wherein the curved portion is a portion of the plurality of tubes, and the portion is configured to be moved according to reciprocating movement of the inkjet head.

14. The inkjet printer according to claim 2, wherein, at a portion that deforms according to reciprocating movement of the inkjet head in the plurality of tubes, the plurality of tubes is adjacently aligned in the vertical direction.

15. An inkjet printer comprising:
an inkjet head configured to discharge ink;
a plurality of ink storage portions, in each of which ink to be supplied to the inkjet head is stored, and each of which has a replenishing port for replenishing ink; and
a plurality of tubes configured to connect the plurality of ink storage portions with the inkjet head,
wherein, in the inkjet printer, the plurality of tubes includes a curved portion which is curved in a horizontal direction where the plurality of tubes is adjacently aligned in a vertical direction, a first portion which is connected to the inkjet head where the plurality of tubes is aligned in the horizontal direction, and a second portion where the plurality of tubes is adjacently aligned in the vertical direction between the curved portion and the first portion,
wherein the inkjet head is configured to move in a reciprocating manner in a direction intersecting with a conveying direction of a recording medium, and
wherein the replenishing port has a detachable cap and is provided so that an upper side of the replenishing port is configured to be open in the vertical direction.

16. The inkjet printer according to claim 15, wherein, between the first portion and the second portion, the plurality of tubes includes a third portion extending in the vertical direction.

17. The inkjet printer according to claim 15, wherein the plurality of ink storage portions is positioned at a front side of the inkjet printer, and the plurality of tubes is connected to a side of the inkjet head at the front side of the inkjet printer.

* * * * *